(12) United States Patent
Takeda (10) Patent No.: US 7,119,946 B2
(45) Date of Patent: Oct. 10, 2006

(54) PROCESS FOR PRODUCING DISPLAY DEVICE

(75) Inventor: Toshihiko Takeda, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 10/853,880

(22) Filed: May 26, 2004

(65) Prior Publication Data

US 2005/0006337 A1    Jan. 13, 2005

(30) Foreign Application Priority Data

May 27, 2003    (JP)    ............................. 2003-149653

(51) Int. Cl.
*G02B 26/00*    (2006.01)
*G09G 3/34*    (2006.01)

(52) U.S. Cl. ...................... 359/296; 345/107

(58) Field of Classification Search ............... 359/296, 359/243, 245, 295, 290; 345/107
See application file for complete search history.

(56) References Cited

U.S. PATENT DOCUMENTS

6,525,865 B1    2/2003    Katase ........................ 359/296

*Primary Examiner*—Timothy Thompson
*Assistant Examiner*—Jerry Fang
(74) *Attorney, Agent, or Firm*—Morgan & Finnegan, LLP (57) ABSTRACT

A process for producing a display device includes (a) a providing an area having affinity for a partition wall precursor higher than a surrounding area at an outermost surface of a first substrate, (b) providing an area having affinity for a partition wall precursor corresponding to the area of the first substrate at an outermost surface of a second substrate, (c) disposing the first substrate and the second substrate opposite to each other with a spacing and filling the spacing with a liquid containing the partition wall precursor, (d) collecting the partition wall precursor in a spacing between the areas of the first and second substrates, and (e) fixing the collected partition wall precursor. Such a partition wall has a high adhesiveness and prevents charged particles from entering an adjacent pixel even if contained in a liquid.

16 Claims, 4 Drawing Sheets

PROCESS FOR PRODUCING DISPLAY DEVICE

FIELD OF THE INVENTION AND RELATED ART

The present invention relates to a process for producing a display device which reflects a distribution state of a group of electrophoretic particles in a display state.

When charged electrophoretic particles are supplied with an electric field in an insulating liquid, the electrophoretic particles are moved displacement under the action of electrophoresis. In recent years, an electrophoretic display device (EPD) utilizing this electrophoresis phenomenon has been extensively developed. Compared with a liquid crystal display device, the EPD has advantageous features, such as a high display contrast, no viewing angle dependence, a display state memory characteristic, a flexible device structure, and no need of a backlight or a polarizer.

As described above, the electrophoretic particles are dispersed in the liquid, so that the electrophoretic particles are readily displaced in a substrate surface direction by diffusion etc. This displacement induces a deterioration in display image, so that it is necessary to restrict a movable area of the fine particles (electrophoretic particles). One of methods of restricting the movable area of the fine particles is that a plurality of minute hollow spaces are formed on a substrate for device and the electrophoretic particles and the insulating liquid are confined. If this confinement is completely performed, it is possible to restrict he particle displacement area to the minute hollow spaces in which the electrophoretic particles are confined.

Such a process wherein a state of confinement of electrophoretic particles, insulating liquid, etc., is created in hollow spaces has been proposed, e.g., in U.S. Pat. No. 6,525,865. According to the particle confinement method of this U.S. patent, at first, a partition wall is formed on a substrate so as to define a plurality of cells. As a partition wall forming means (method), it is possible to use an etching method, an ink jet method and an embossing method. The etching method corresponds to a known photolithographic method. In the etching method a partition wall is formed by subjecting a photosensitive coating film to mask exposure, followed by development and vinse. In the ink jet method, a partition wall is formed by gradually depositing a partition wall forming material on a substrate, followed by curing of the partition wall forming material. In the embossing method, a pressure is applied to a plate-like material to provide the material with an unevenness and at the same time, a partition wall is formed. Then, in each of the defined cells, a mixture (dispersion system) comprising electrophoretic particles and liquid is filled by the ink jet method. On the dispersion system, a sealing material is applied and cured to crate a state wherein the dispersion system is confined. Thereafter the cured sealing material disposed on the substrate provided with the partition wall and an opposite substrate are bonded to each other to complete a display device. The sealing material is required not to be soluble in or mixed with the dispersion system.

Further, the U.S. patent also discloses a process wherein a mixture of the dispersion system and the sealing material is filled in the respective cells by the ink jet method. In this case, if the sealing material has a specific gravity smaller than that of the dispersion system and they are not soluble in each other, the sealing material and the dispersion system are (phase-) separated from each other. As a result, a state in which the sealing material is disposed on the dispersion system is finally created. In such a state, the sealing material is cured to form a state that the dispersion system is confined. Thereafter, the cured sealing material disposed on the partition wall-formed substrate and an opposite substrate are bonded to each other to complete a display device.

However, the conventional partition wall forming process has been accompanied with the following problems.

First, in the partition wall formation by the ink jet method, it is difficult to deposite the partition wall forming material unless the partition wall forming material has a high viscosity. For this reason, there is a constant on the partition wall forming material. Further, in order to discharge or eject the material having a high viscosity, an increase in discharge pressure of an ink jet apparatus, maintenance of the apparatus, etc., are necessitated, so that a load on the apparatus is increased. Further, in the case of forming the partition wall by the ink jet method, there also arises such a problem that a discharge (ejection) position of the partition wall forming material is liable to be deviated from a desired discharge position as the substrate size becomes larger.

On the other hand, a positional accuracy of the partition wall on the substrate is lowered as the substrate size is increased. Further, ununiformly in height of the partition wall is also caused to occur. For this reason, ensuring of filling of a predetermined amount of the dispersion system or the like in all the plurality of cells partitioned by the partition wall is not readily realized by the ink jet method. Accordingly, there is a possibility of lowering in production yield.

Further, as described in the U.S. patent, the specific gravity of the sealing material is required to be smaller than that of the dispersion system. For example, if a solvent of isoparaffin type which is frequently used as a dispersion medium, the specific gravity of the sealing material is required to be less than 1. However, most of curable materials have specific gravities larger than 1. For this reason, the scope of selection of the materials becomes small. As described above, the sealing material has a specific gravity restriction, so that a constraint on the sealing material is also problematic.

Further, in the case of curing the sealing material with ultraviolet rays, it is impossible to use the sealing material unless it is curable even in contact with air. For this reason, it has been difficult to use an inexpensive acrylate type ultraviolet curable material capable of being formed in a flexible film.

SUMMARY OF THE INVENTION

An object of the present invention is to provide a process for producing a display device having solved the above-mentioned problems.

According to a first aspect of the present invention, there is provided a process for producing a display device, comprising:

(a) a step of providing an area having an affinity for a partition wall precursor higher than a surrounding area therearound at an outermost surface of a first substrate, (b) a step of providing an area having an affinity for a partition wall precursor at least in an area corresponding to the area of the first substrate at an outermost surface of a second substrate, (c) a step of disposing the first substrate and the second substrate opposite to each other with a spacing therebetween and filling the spacing with a liquid containing the partition wall precursor, (d) a step of collecting the partition wall precursor between the area of the first substrate and the area of the second substrate in the spacing, and (e) a step of fixing the collected partition wall precursor.

According to a second aspect of the present invention is to provide a partition wall structure, comprising:

a first substrate and a second substrate disposed opposite to each other with a spacing therebetween, a partition wall disposed in the spacing between the first and second substrates, a liquid held in the spacing between the first and second substrates and being capable of holding a precursor of the partition wall dissolved or dispersed therein, an area, having a high affinity for the precursor higher than a surrounding area, disposed between an outermost surface of the first substrate and a lower end of the partition wall, and an area, having an affinity for the precursor, disposed between an outermost surface of the second substrate and at least an upper end of the partition wall.

According to the present invention, it is possible to relieve the above described problems. As a result, it becomes possible to form a partition wall which prevents electrophoretic particles (charged particles) from entering adjacent pixels even in the case where the electrophoretic particles are contained in liquid.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, preferred embodiments of the present invention will be described.

The production process according to the first aspect of the present invention is characterized by forming a partition wall structure through the following steps:

(a) a step of providing an area having an affinity for a partition wall precursor higher than a surrounding area therearound at an outermost surface of a first substrate, (b) a step of providing an area having an affinity for a partition wall precursor at least in an area corresponding to the area of the first substrate at an outermost surface of a second substrate, (c) a step of disposing the first substrate and the second substrate opposite to each other with a spacing therebetween and filling the spacing with a liquid containing the partition wall precursor, (d) a step of collecting the partition wall precursor between the area of the first substrate and the area of the second substrate in the spacing, and (e) a step of fixing the collected partition wall precursor.

The partition wall precursor described above is not particularly limited but may preferably be a liquid. Further, the partition wall precursor may preferably be solidified in the above described fixing step (e). This is because by the solidification, not only confinement of the above described electrophoretic particles but also retainment of the spacing between the first and second substrates are ensured with reliability. As such a partition wall precursor, it is possible to use a precursor comprising a liquid polymerizable compound, such as a photopolymerizable compound. The type of the polymerizable compound is not limited so long as it can provide a desired partition wall.

On the other hand, in the above described high affinity area on the substrate, such a treatment that an affinity for the partition wall precursor (in the high affinity area) is higher than that in the surrounding area therearound is selectively effected. As the treatment, it is possible to use a chemical treatment of the substrate surface or a treatment that a projection-like structure and/or a recess-like structure is formed on the substrate surface. Such an affinity-imparting treatment is not particularly restricted so long as the partition wall precursor described above can be collected in a desired state. The chemical treatment therefor may be effected in a desired planar position (corresponding to the high affinity area) or at the surface of the above-described structure.

The production process of the present invention is suitable for production of an electrophoretic display device. Particularly, in such an electrophoretic display device in which charged particles are dispersed in a liquid, it is necessary to form a partition wall structure for partitioning adjacent pixels. Accordingly, the production process of such an electrophoretic display device is an optimum example to which the production process of the present invention is applicable.

Hereinbelow, an embodiment of the production process according to the first aspect of the present invention will be described specifically with reference to the drawings.

Figure 1:
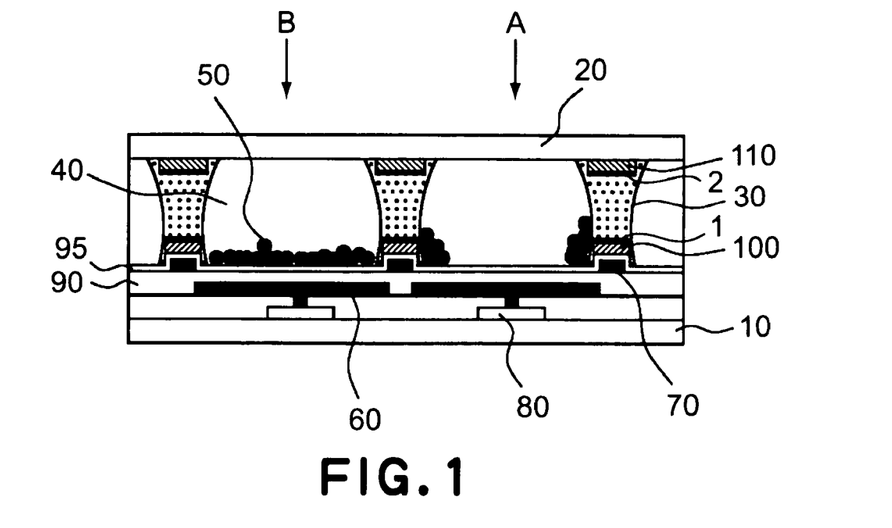
FIG. 1 is a schematic sectional view illustrating an embodiment of a display device produced by the process of the present invention.

FIG. 1 is a schematic sectional view of a display device produced through the production process according to the first aspect of the present invention.

Referring to FIG. 1, the display device includes a first substrate 10, a transparent second substrate 20, a partition wall 30, a dispersion medium 40, electrophoretic particles 50, a first electrode 60 disposed at each pixel, a second electrode 70 disposed at a boundary between adjacent pixels, a switching device 80, such as TFT (thin film transistor), disposed with respect to each pixel, and insulating layers 90 and 95.

An area 1 is an area, which is formed in correspondence with a predetermined partition wall forming position, having an affinity for a partition wall precursor described later higher than a surrounding area. The partition wall is formed at a spacing (boundary portion) between adjacent pixels, so that the area 1 may preferably be formed in the same pattern as the partition wall.

As shown in FIG. 1, in the case where the insulating layer 95 is formed on the second electrode 70, it is possible to impact an affinity by selectively modifying the surface of the insulating layer 95 at a molecular level. Alternatively, it is also possible to provide a projected (minute) structure 100 formed on the insulating layer 95 with such a property that the partition wall precursor is liable to attach the surface of the structure 100 rather than its surrounding portion or area. Further, the affinity may be enhanced by modifying the structure surface.

The insulating layer 95 covering the second electrode 70 has a projection due to the structure of the electrode 70 as shown in FIG. 1 but may be flattened. Such a flattened state of the insulating layer is schematically shown in FIG. 16, a reference numeral 96 represents an insulating layer covering the second electrode 70. It is also possible to form a projected structure 100 on the flattened insulating layer 96 and the resultant surface may be used as the high affinity area. Alternatively, the surface of the structure 100 is modified to be used as the high affinity area.

In the case where the insulating layer 95 or 96 is not formed on the substrate 10, the above described area 1 can be formed on the surface of the second electrode 70 between adjacent pixels.

An area 2 is an area to which an affinity for the partition wall precursor is imparted on the second substrate 20 side. The area 2 is disposed in correspondence with the position of the partition wall on the second substrate 20 side. The partition wall forming position is actually determined by the position of the area 1, so that a pattern of the high affinity area 2 on the substrate 20 side is not particularly limited. For example, the high affinity area may be provided over the entire surface of the substrate 20.

Figure 6:
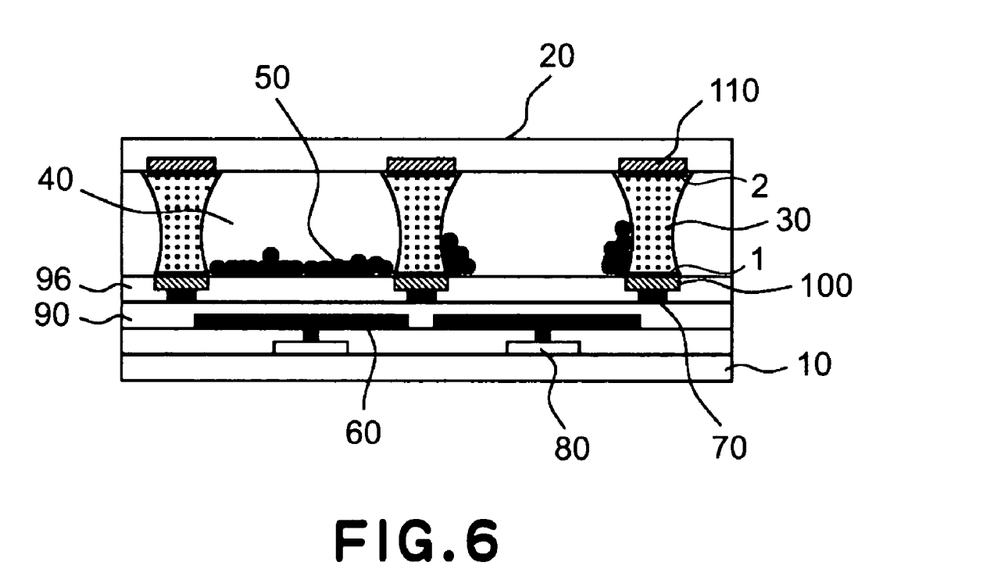

In FIG. 1, the high affinity area 2 is formed on the surface of a projected (minute) structure 110. However, the high affinity area on the second substrate 20 side may be formed as a surface of a projected structure 110 formed as a part of the second substrate 20 as shown in FIG. 6. Further, it is possible to provide a high affinity area by modifying the surface of the structure 110.

With respect to the high affinity area, the height of the (minute) structures 100 and 110 is not particularly limited. The first and second substrates 10 and 20 are oppositely disposed at a predetermined spacing therebetween, so that the height of the structures 100 and 110 may be arbitrarily set within such a range wherein the structure 100 does not contact the opposite substrate 20 or the opposite structure 110 on the substrate 20 side.

Incidentally, the display device further includes other constitutional elements, other than those shown in FIG. 1, such as electric signal application means for applying an electric signal between the electrodes.

The display device produced through the production process of the present invention reflects a distribution state of the electrophoretic particles 50 in a display state.

More specifically, in FIG. 1, each of A and B represents one pixel. The pixel A in a distribution state wherein the electrophoretic particles 50 gather on the partition wall 30 side. When the pixel A is observed from the second substrate 20 film 30 side of the display device, the pixel A looks white if the surface of the first electrode 60 or the insulating layer 90 is white. On the other hand, the pixel B is in a distribution state wherein the electrophoretic particles 50 are dispersed in the substrate surface direction. When the pixel B is observed from the second substrate 20 side, the pixel B looks like the color (black in this embodiment) of the electrophoretic particles 50.

In order to change the display state, the electrophoretic particles 50 are displaced on the substrate to be changed in distribution state. For example, it is possible to electrophoretically move and displace the electrophoretic particles 50 by applying an electric signal between the first and second electrodes. In the present invention, a method of displacing the electrophoretic particles on the substrate required at the time of changing the display state is not particularly limited. For example, the electrophoretic particles may be moved on the substrate by utilizing dielectric migration force or electrically hydrodynamic flow of the dispersion medium.

In the above description, the color of the electrophoretic particles is black and that of the first electrode surface (or the insulating layer 90) is white but are not limitative. For example, it is also possible to effect color display by appropriately changing the color of the first electrode surface (or the insulating layer 90) to red, green, blue, etc.

In FIG. 1, the electrode system (structure) is disposed on the first substrate 10 side. The electric field created by the electrode system largely displaces the electrophoretic particles in the planar direction of the first substrate. In the present invention, however, it is also possible to adopt an electrode structure for largely displacing the electrophoretic particles in the vertical direction of the first substrate as long as a desired display state is created.

The sectional shape of the partition wall 30 is not restricted to that shown in FIG. 1. In FIG. 1, the partition wall 30 has such a sectional shape that it is constricted in the vicinity of the center of the spacing between the first and second substrates, but may have such a shape that it expands toward the dispersion liquid. Further, end portions of the partition wall 30 fixed to the upper (second) and lower (first) substrates 20 and 10 have shapes which substantially correspond to those of the above described high affinity areas 1 and 2. However, in some cases, the width of the partition wall to be formed is different from that of an associated high affinity area depending on a solidification condition of the partition wall precursor.

When the high affinity area is formed on the entire surface of the second substrate 20, a film, of a material identical to that of the partition wall, connected to the partition wall is formed on the second substrate 20 surface, thus ensuring a strong fixation between the substrates.

Hereinbelow, an embodiment of the production process of the display device shown in FIG. 1 will be explained with reference to the drawings.

<Step 1>

A a step until an affinity for the partition wall precursor is imparted to the first and second substrates is as follows.

First, on the first substrate 10, switching devices 80 are formed (as shown in FIG. 1) and then covered with an insulating layer. In the insulating layer, contact holes are provided. Thereafter, on the insulating layer, a resist pattern for scattering incident light is formed, and thereon, the first electrode 60 (of, e.g., aluminum exhibiting a high light reflectance) is formed so as to be connected with the switching device 80 through the contact hole. If the first electrode 60 has the high light reflectance, it also functions as a light reflecting/scattering layer.

The first electrode 60 is covered with an insulating layer 90 having a light scattering property. On the insulating layer 90, a second electrode 70 is formed. On the second electrode 70, an insulating layer 95 is formed.

With respect to the insulating layer 95, a treatment of imparting an affinity for the partition wall precursor is effected selectively in a predetermined area where a lower end portion of the partition wall 30 contacts the first substrate 10. The affinity imparting treatment may be effected on the surface of the second electrode 70 without forming the insulating layer 95.

Similarly, the treatment of imparting an affinity for the partition wall precursor is also effected in a predetermined area where an upper end portion of the partition wall 30 contacts the second substrate 20. The area 2 provided on the second substrate 20 side shown in FIG. 1 corresponds to the high affinity area (predetermined area).

The affinity importation can be performed through a known method and is not particularly limited. For example, it is possible to adopt a selective surface chemical treatment or an impartation of minute surface unevenness. An affinity-reducing treatment may also be effected in an area other than the high affinity area. In the present invention, such an affinity-reducing treatment is also referred to as the affinity imparting treatment.

In the high affinity area, it is preferable that an adhesive property thereof with the partition wall end portion is exhibited in a fixing treatment of the partition wall in Step 4 described later.

<Step 2>

Figure 2:
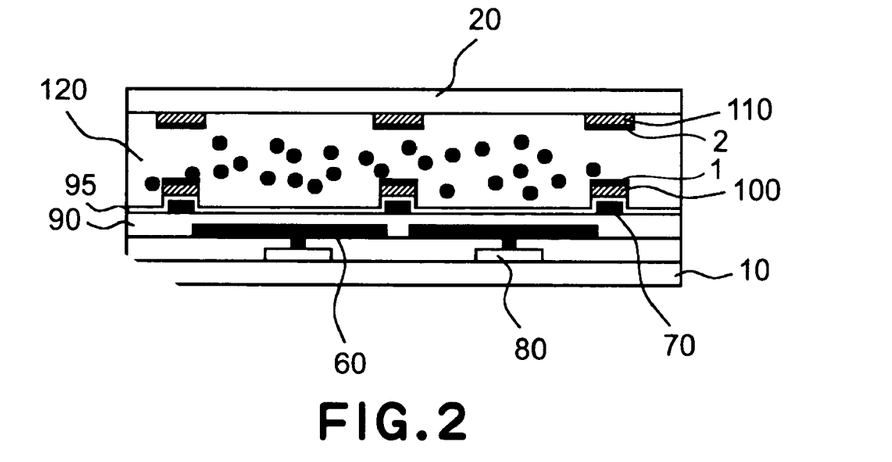
FIGS. 2, 3 and 4 are respectively a schematic sectional view for illustrating a process for producing a display device according to the present invention.

FIG. 2 is an explanatory view of Step 2. Step 2 is a step until the first substrate 10 and the second substrate 20 are disposed opposite to each other and a mixture comprising the dispersion liquid and the partition wall precursor is filled therebetween.

First, the first and second substrates 10 and 20 are positionally aligned and oppositely disposed so that the high affinity area 1 provided to the first substrate 10 and the high affinity area 2 provided to the second substrate 20 provide a desired positional relationship. Then, a mixture 120 comprising a dispersion liquid and a partition wall precursor is filled between the substrates 10 and 20. In the mixture 120, the partition wall precursor may be dissolved in the dispersion liquid but may also be dispersed therein in a minute droplet form.

The partition wall precursor may preferably be uniformly distributed in the substrate surface direction immediately after the filling operation.

<Step 3>

Figure 3:
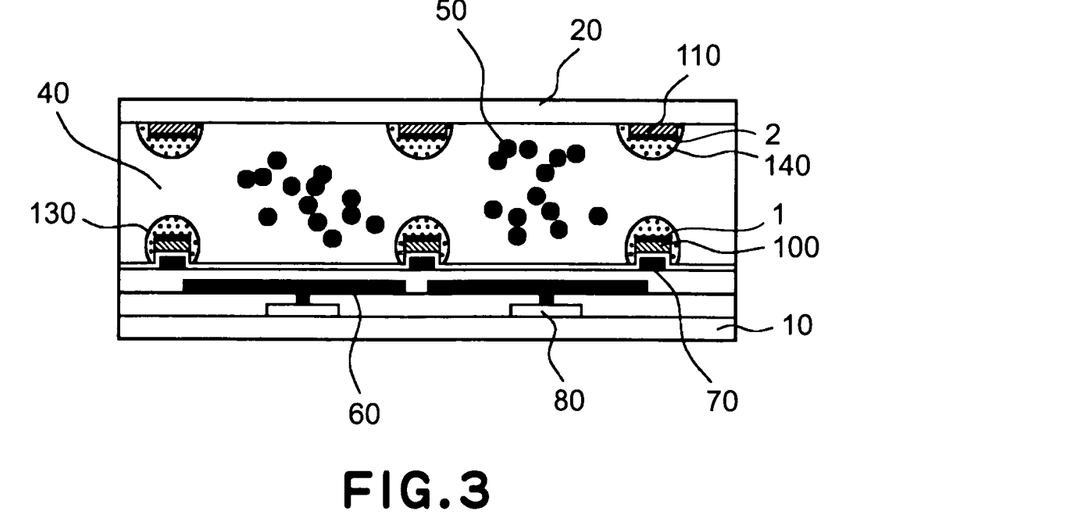
Figure 4:
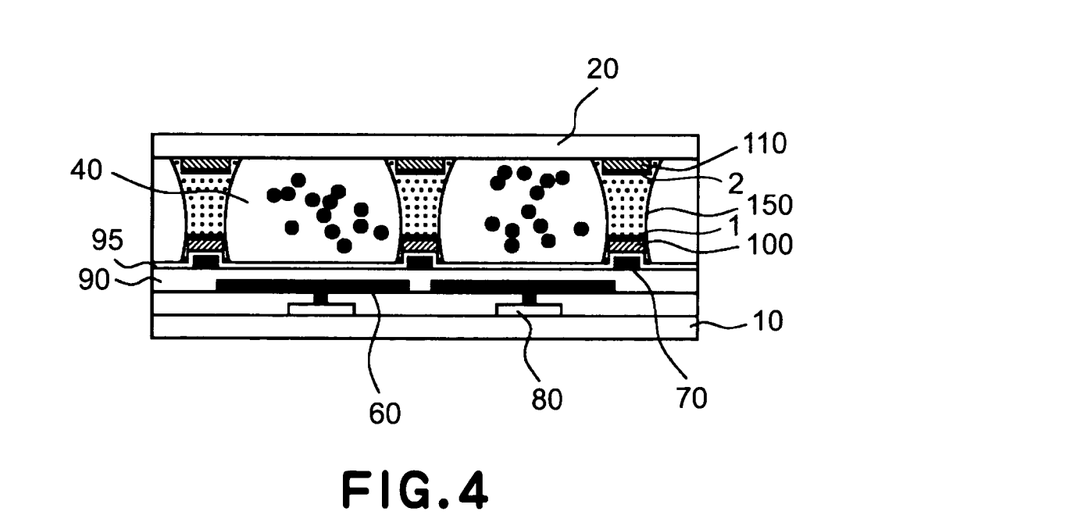

FIGS. 3 and 4 are explanatory views of Step 3. Step 3 is a step until a state that the partition wall precursor is connected with each other between the substrates by collecting it in the predetermined area for partition wall formation between the substrates.

The partition wall precursor in the mixture filled between the substrates in Step 2 described above possesses an affinity for the high affinity areas 1 and 2, so that it is first collected toward the surfaces of the areas. FIG. 3 schematically illustrates the process of collection. Referring to FIG. 3, reference numerals 130 and 140 represent partition wall precursors collected in the vicinity of the high affinity areas 1 and 2, respectively. When the partition wall precursor is liquid and dissolved or dispersed as minute droplets in the mixture, each of the reference numerals 130 and 140 represents a high concentration area of the partition wall precursor in the mixture.

Even after the high affinity areas 1 and 2 are covered with the partition wall precursors 130 and 140, respectively, the partition wall precursor is still present in the mixture and thus is collected onto the partition wall precursors 130 and 140 covering the high affinity areas 1 and 2. This collection is further accelerated when an affinity, of the partition wall precursor, for a dispersion medium is set to be smaller than a mutual affinity between the partition wall precursors.

When the process of the collection proceeds, such a state that the partition wall precursors are connected with each other between the substrates, is created. FIG. 4 schematically illustrates a state the connected state of the partition wall precursors is created. In FIG. 4, a reference numeral 150 represents the partition wall precursor which connects the substrates.

The process of collection of the partition wall precursor described above is realized by utilizing an affinity between the partition wall precursor and the substrate surface or an affinity between the partition wall precursors, as one of driving forces. The affinity-based force is a short-range force and if both members once contact each other, they are adhered to each other by strange force. In many cases, this adhesive force is larger than gravity. For example, in the case where the partition wall precursor is liquid, the affinity-based adhesive force is not less than 100 times the gravity. Accordingly, there is no constraint on a specific gravity or viscosity of the partition wall precursor.

In order to accelerate the collection of the partition wall precursor in the high affinity area, a mechanical vibration may be exerted on the above described mixture. Further, to the electrode 60, it is also possible to apply an electric signal for permitting collection of the particles.

<Step 4>

Step 4 is a step of effecting a fixing treatment of the partition wall precursor. The partition wall precursor per se, collected between the high affinity areas of the upper and lower substrates, is cured in the place and fixed in such a state that it contacts the upper and lower substrates. As a result, the partition wall as shown in FIG. 1 is formed. As described above, it is preferable that an adhesive property between the high affinity area and the partition wall is exhibited in this step.

The method of fixing the partition wall precursor depends on a property of the partition wall precursor. For example, in the case where the partition wall precursor is constituted by a polymerizable compound, it is possible to effect a polymerizing treatment depending on the property of the partition wall precursor as the fixing treatment. In the case where a partition wall precursor comprising a photopolymerizable compound is used, a photopolymerization treatment may be effected. The partition wall precursor in this step is located between the substrates, so that it does not contact ambient air. Accordingly, as the partition wall precursor, it is possible to use ultraviolet polymerizable material of a radical polymerization type.

When the display device is produced, in addition to the above described Steps 1 to 4, it is possible t further add other steps including a step of connection of the display device with electric signal application means.

Next, materials or the like used in the present invention will be described.

The dispersion medium used in the present invention is an insulating liquid. As the insulating liquid, it is possible to use an organic solvent, such as isoparaffin (e.g., trade name: "Isopar", mfd. by Exxon Corp.), silicone oil, xylene or toluene.

The electrophoretic particles are not particularly restricted in material, particle size and color as long as they can effect a desired display. It is preferable that a material therefor is colored and possesses good negative or positive chargeability. Examples of such material may include various inorganic and organic pigments, carbon black and resins containing the pigments or carbon black. The particle size of the exposed surfaces may generally be ca. 0.01–50 μm, preferably ca. 0.1–10 μm.

In the above-mentioned insulating liquid or the electrophoretic particles, a charge control agent for controlling and stabilizing chargeability of the electrophoretic particles may be added. Examples of the charge control agent may include succinimide, monoazo dye metal complex salt, salicyclic acid, organic quaternary ammonium salt, and nigrosin compound.

Next, the partition wall precursor used in the present invention will be described.

The partition wall precursor used in the present invention may be liquid or solid.

In the case where the partition wall precursor is liquid, the partition wall precursor may preferably have a property that it is solidified by the fixing treatment in Step 4 described above. For this reason, the liquid partition wall precursor may preferably be constituted by the polymerizable compound. In this case, it is possible to effect a polymerizing treatment of the compound as the fixing treatment described above.

The liquid partition wall precursor may preferably have a mutual affinity between the partition wall precursors larger than an affinity for the dispersion medium. As a result, the collection of the partition wall precursor in Step 3 is accelerated.

The partition wall precursor may preferably be not dissolved in the dispersion medium. Further, the partition wall precursor may preferably have a small affinity to the electrophoretic particles and it is preferable that it does not dissolve therein the electrophoretic particles.

The polymerizable compound constituting such a partition wall precursor is not particularly limited so long as it can form a desired partition wall, but may preferably have a partial structure having at least one group selected from the group consisting of —O—, —CH$_2$O—, —OH and —CH$_2$—.

By having such a partial structure, the resultant partition wall is not mixed (dissolved) in the dispersion medium. Further, it is also possible to control a physicochemical interaction between the resultant sealing film and the electrophoretic particles. As described above, when the polymerizable compound has the above-mentioned partial structure, it is effective in not only producing the partition wall but also controlling the functions of the partition wall. Adhesion (force) between the electrophoretic particles and the partition wall is an example of the physicochemical interaction and can be controlled by surface energy of the partition wall. As the surface energy of the partition wall is smaller, the resultant adhesive force can be made smaller.

The polymerizable compound having the partial structure of —CH$_2$—O— may include polymerizable compounds having a unit of —CH$_2$—CH$_2$—O—, a polyethylene glycol unit of (—CH$_2$—CH$_2$O)$_n$ (n: integer), or a unit of —CH$_2$—O—CH$_2$—CH$_2$—CH$_2$—CH$_2$—O—CH$_2$—.

Further, the polymerizable compound having the partial structure of —O— may include polymerizable compounds having adjacent groups —O— and —CH$_2$— (e.g., polyethylene glycol type) or having a unit not containing adjacent —CF$_2$— group (e.g., carbonate linkage).

The polymerizable compound having the partial structure of —CH$_2$— may include polymerizable compounds having a unit of repetitive —CF$_2$— group.

The polymerization process for the partition wall is not restricted as long as a desired partition wall can be prepared. For example, the partition wall can be formed through a photopolymerization process represented by UV polymerization.

In the case of employing the UV polymerization, it is possible to utilize a radical-polymerizable acrylate or methacrylate compound, having the partial structure of —OH, —CH$_2$—O—, —O—, —CF$_2$—, as the polymerizable compound. For example, such a (meth-)acrylate compound may include: 2-hydroxyethyl methacrylate; 1,4-butanediol diglycidyl ether diacrylate; polyethyleneglycol monomethacrylate (e.g., "Blenmer PE" series, mfd. by Nippon Yushi K.K.); polytetramethylene ether glycol=di(2-maleimide acetate) (e.g., "MIA 200", mfd. by Dainippon Ink And Chemicals, Inc.); 1H, 1H, 5H-octafluoropentyl acrylate (e.g., "V-8F", mfd. by Osaka Yuki Kagaku Kogyo K.K.); and 1H, 1H, 2H, 2H-heptadecafluorodecyl acrylate (e.g., "V-17F", mfd. by Osaka Yuki Kagaku Kogyo K.K.).

The polymerizable compound may be a polymerizable monomer or a polymerizable oligomer. These monomer and oligomer may be monofunctional compounds or polyfunctional compounds. Further, the polymerizable compound may be a mixture of the monomer and the oligomer or a mixture of the monofunctional and polyfunctional compounds.

The polymerizable compound may be polymerized by irradiating it with light (e.g., UV light) in the presence of a photopolymerization initiator, such as "Irgacure 184" or "Irgacure 641" both available from Ciba Speciality Chemical K.K.) or "MIA 200" available from Dainippon Ink And Chemicals Inc.

In the case where the partition wall precursor is solid, its size or shape is not particularly limited so long as it can provide a predetermined partition wall. For example, a group of fine particles smaller than the spacing between the substrates may be utilized as the partition wall precursor. In this case, it is preferable that at least the fine particles as the partition wall precursor are bonded to each other at the time of fixing treatment. For this reason, it is preferable that the surface of the partition wall precursor in the form of fine particles is provided with an adhesive layer for realizing the above adhesion. The adhesion layer is not particularly limited so long as a predetermined adhesion can be realized. The solid partition wall precursor may preferably be not dissolved in the above described dispersion medium.

The substrate used in the present invention is not particularly limited. As such a substrate, it is possible to use not only a soft (flexible) substrate of PET (polyethylene terephthalate), PC (polycarbonate), PES (polyethersulfone), etc., but also a hard substrate of glass, quartz, etc. In the case where the partition wall precursor is the photopolymerizable compound described above, the substrate to be irradiated with light for polymerization is required to have a transparency to the light for polymerization.

Next, a material for the high affinity area described above will be explained. The material is not particularly limited so long as it can impart an affinity for the partition wall precursor. For example, if the partition wall precursor has a higher affinity for water them the dispersion medium, hydrophilic molecules may be disposed in the predetermined partition wall forming area.

In the high affinity area, it is preferable that the adhesive property with the partition wall can be exhibited after the fixing treatment. For this reason, in the high affinity area, it is also possible to provide a polymerizable group capable of forming a linkage with the partition wall or a polar group capable of improving the adhesive property.

The material and arrangement of the electrodes used in the present invention are also not largely restricted so long as they can realize a desired display. The material for the electrodes may be Al or ITO (indium tin oxide). The electrode arrangement is not particularly limited so long as it can induce a desired displacement of the electrophoretic particles required to cause necessary change in display state. In the case of using the above-mentioned first electrode 60 as also the light reflection layer, a high light-reflective material such as silver (Ag) or aluminum (Al) may suitably be used. In the case of using the first electrode 60 as an electrode for white display, the first electrodes per se is provided with a surface unevenness so as to cause irregular reflection of light. Alternatively, on the first electrode, a light scattering layer may be formed.

Hereinbelow, the present invention will be described based on Examples.

EXAMPLE 1

An electric display device as shown in FIG. 1 was prepared.

The resultant display device has 500×600 pixels each has a size of 100 μm×100 μm. Each pixel is surrounded by a partition wall 30 having a width of 8 μm and a height of 28 μm. A first electrode 60 is located between the adjacent partition walls 20 and is connected to a switching device 80. A second electrode 70 is located between the partition wall 30 and a substrate 10. The second electrode 70 is an electrode which is common to all the pixels.

A specific production process of the display device in this embodiment will be described.

On a substrate 10, a switching device 80 was formed through a known photolithographic process. A first electrode 60 in this embodiment was formed of aluminum, and an insulating layer 90 was formed of acrylic resin. A second electrode 70 was formed of dark black titanium carbide, and an insulating layer 95 covering the second electrode 70 and the insulating layer 90 was formed of aluminum.

In this embodiment, in only a predetermined area on the insulating layer 95 (on the second electrode 70 in this embodiment), an oxygen plasma treatment was effected to impart an affinity for water. This area was used as a high affinity area 100.

On the other hand, only in a predetermined position of a second substrate 20 (a PET substrate in this embodiment), an oxygen plasma treatment was effected. An area in which an affinity for water was increased was used as a high affinity area 110 on the second substrate 20 side.

On four frame portions on the first substrate 10, a spacer having a diameter of 10 μm was disposed and then the second substrate 20 was disposed opposite to the first substrate 10. Between the substrates 10 and 20, a mixture 120 comprising a dispersion medium, electrophoretic particles and a liquid partition wall precursor was filled (FIG. 2).

In this embodiment, as the dispersion medium, an isoparaffin (trade name: "Isoper", mfd. by Exxon Corp.; specific gravity=0.76) containing succinimide (trade name: "OLOA 1200", mfd. by Shevron Corp.) as a charge control agent was used. As the electrophoretic particles, a carbon black-containing styrene-methyl particle size of about 1–20 μm was used. As the liquid partition wall precursor, a liquid ultraviolet polymerizable compound, which was not dissolved in Isopar (isoparaffin), comprising polytetramethylene ether glycol=di(2-maleimide acetate) (trade name: "MIA 200", mfd. by Dainippon Ink and Chemicals, Inc.; specific gravity=not less than 1; viscosity=2000 mPa.s) was used. The ultraviolet polymerizable compound a the partition wall precursor contains a plurality of ether linkages or the like in its molecule, so that it has a large affinity for water than Isopar. As a result, the resultant high affinity area in this embodiment exhibits an affinity for the partition wall precursor. The ultraviolet polymerizable compound has a small affinity for the electrophoretic particles.

In this embodiment, before filling the mixture between the substrates, ultrasonic vibration was effected with respect to the mixture, whereby the electrophoretic particles were uniformly dispersed in the dispersion medium. At the same time, the liquid partition wall precursor was charged into minute droplets by the ultrasonic vibration. Further, the partition wall precursor droplets are also dispersed in the dispersion medium.

From immediately after the mixture was filled between the substrates, the spacing between the substrates was observed through an optical microscope. As a result, such a state that the partition wall precursor was adhered to the respective high affinity areas of the substrates to cover the entire surface of an associated predetermined partition wall forming area was first observed. During a period wherein the partition wall precursor covered the entire surface of the predetermined partition wall forming area, the electrophoretic particles were moved over the high affinity areas. Further, during a period wherein the partition wall precursor covered the entire surface of the high affinity areas, a focus of the optical microscope was shifted from one of the high affinity areas to the high affinity area. As a result, in the vicinity of the high affinity area, there was an area in which the electrophoretic particles were not observed (referred to as an "area A"). Between the high affinity areas, there was an area wherein the electrophoretic particles were observed (referred to as "area B"). Further, an optical discontinuity was observed at a boundary between the areas A and B. These mean such a fact that the partition wall precursor covers the predetermined partition wall forming area of each of the substrates, but a state that the partition wall precursors are connected between the substrates is not created. Such a state is schematically illustrated in FIG. 3. In FIG. 3, reference numerals 130 and 140 represent a partition wall precursor covering the high affinity area.

When the observation through the optical microscope was continued, a state that the partition wall precursor in the form of minute droplets was adsorbed in the area A was observed. In this process, a state that the area B was gradually decreased and the area A was gradually increased between the opposite high affinity areas, was observed. When the observation was further continued, the movement of the electrophoretic particle over the high affinity areas was stopped. At this time, the focus of the optical microscope was shifted between the opposite high affinity areas but the optical discontinuity as described above was not observed. Accordingly, the spacing between the high affinity areas was optically uniform. Further, during the shift of the focus of the optical microscope, the electrophoretic particles were also not observed. This means that the opposite high affinity areas are connected with each other by the partition wall precursor described above. Such a state between the substrates is schematically illustrated in FIG. 4. The fact that the state shown in FIG. 4 is created, was also confirmed in a display device to which a polymerizing treatment was effected as described below.

After the state shown in FIG. 4 was created, the polymerizing treatment to the partition wall precursor was effected by irradiation with ultraviolet rays for 5 minutes at an intensity of 0.3 mW/cm$^2$ in a room temperature environment. As a result, the partition wall was formed and solidified on the high affinity areas. Such a state is schematically illustrated in FIG. 1. In FIG. 1, the partition wall is indicated by a reference numeral 30. In this embodiment, the polymerizing treatment was employed as the fixing treatment.

After the polymerizing treatment, when the resultant display device was observed from above the second substrate 20, the electrophoretic particles were not observed at end portions and within the partition wall. In other words, during the polymerization process, the electrophoretic particles were not incorporated into the partition wall.

Then, drive of the display device of this embodiment was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state. Even when such a drive of the display device was continued, a phenomenon that the electrophoretic particles were moved to get over the partition wall was not observed. At the same time, evaporation of the dispersion medium was also not observed. In other words, it was conformed that the dispersion liquid was confined by the partition wall and the substrates. Further, when the resultant display device was bent back and forth, the phenomenon that the electrophoretic particles were moved to get over the partition wall was not observed.

EXAMPLE 2

A display device was prepared in the same manner as in Example 1 except that a minute structure was formed in high affinity areas without effecting the oxygen plasma treatment in the high affinity areas.

More specifically, in this embodiment, at a predetermined position of the insulating layer 95 (on the second electrode 70 also in this embodiment), a minute projection structure (height=3 μm) was formed of a cured product of a photosensitive (thick-film) resist (trade name: "SU-8", mfd. by 3M Co.). The minute projection structure was used as a predetermined partition wall forming area (high affinity area) on the first substrate 10 side. In this embodiment, the structure 100 shown in FIG. 1 corresponded to the minute projection structure. Similarly, in a predetermined area on the second substrate 20, a minute projection structure (height=5 μm) was formed of the photosensitive resist (SU-8) described above and was used as a high affinity area on the second substrate 20 side. In this embodiment, the structure 110 shown in FIG. 1 corresponded to the minute projection structure 110.

The above prepared first and second substrates are oppositely disposed and between which a mixture identical to that used in Example 1 was filled. As a result a state that the partition wall precursor was connected between the above described minute projection structures, was created. Thereafter, the polymerizing treatment with respect to the partition wall precursor was effected.

After the polymerizing treatment, when the resultant display device was observed from above the second substrate 20, the electrophoretic particles were not observed at end portions and within the partition wall. In other words, during the polymerization process, the electrophoretic particles were not incorporated into the partition wall.

Then, drive of the display device of this embodiment was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state. Even when such a drive of the display device was continued, a phenomenon that the electrophoretic particles were moved to get over the partition wall was not observed. At the same time, evaporation of the dispersion medium was also not observed. In other words, it was conformed that the dispersion liquid was confined by the partition wall and the substrates. Further, when the resultant display device was bent back and forth, the phenomenon that the electrophoretic particles were moved to get over the partition wall was not observed.

EXAMPLE 3

A display device was prepared in the same manner as in Example 1 except that, as the partition wall precursor, an ultraviolet polymerizable compound comprising 1,4-butanediol diglycidyl ether diacrylate (trade name: "NK oligo EA-5520", mfd. by Shin Nakamura Kagaku Kogyo K.K.; specific gravity: not less than 1; viscosity: 750 mPa.s) was used. In the polymerizable compound, a photopolymerization initiator (trade name: "Irgacure 184", mfd. by Ciba-Geigy, Ltd.) was added in an amount of 5 wt. %.

A state that the partition wall precursor was connected between the above described minute projection structures, was created also in this embodiment.

After the polymerizing treatment with respect to the partition wall precursor, when the resultant display device was observed from above the second substrate 20, the electrophoretic particles were not observed at end portions and within the partition wall. In other words, during the polymerization process, the electrophoretic particles were not incorporated into the partition wall.

Then, drive of the display device of this embodiment was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state. Even when such a drive of the display device was continued, a phenomenon that the electrophoretic particles were moved to get over the partition wall was not observed. At the same time, evaporation of the dispersion medium was also not observed. In other words, it was conformed that the dispersion liquid was confined by the partition wall and the substrates. Further, when the resultant display device was bent back and forth, the phenomenon that the electrophoretic particles were moved to get over the partition wall was not observed.

EXAMPLE 4

A display device was prepared in the same manner as in Example 1 except that the entire surface of the second substrate 20 was subjected to the oxygen plasma treatment.

Figure 5:
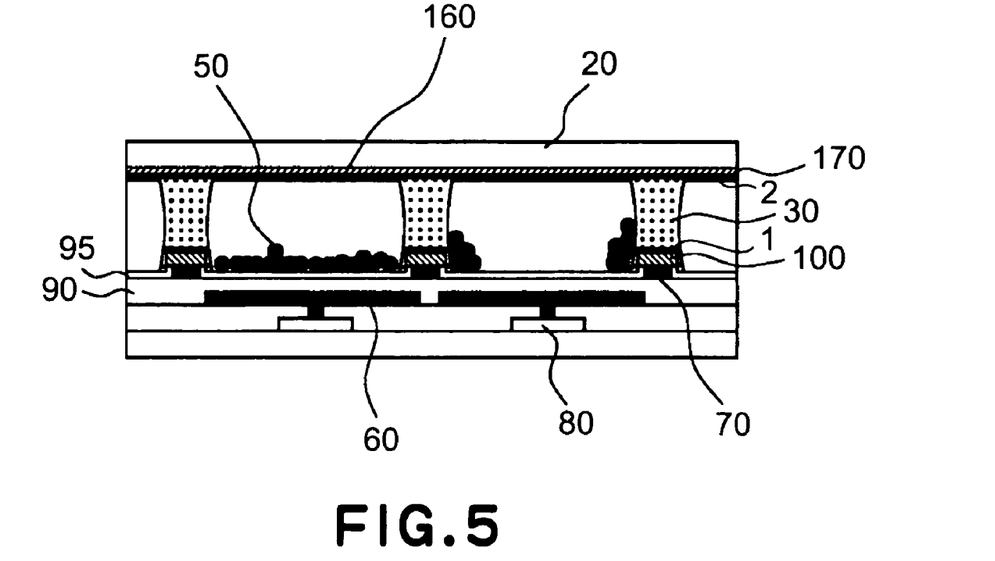
FIGS. 5, 6 and 7 are schematic views each illustrating an embodiment of a display device produced by the process according to the present invention.

When a mixture identical to that used in Example 1 was filled between the first and second substrates, a state that the partition wall precursor covering the entire surface of the second substrate 20 and the partition wall precursor collected in the high affinity area 100 on the first substrate 10 side were connected, was created. This was also confirmed by taking the display device apart after effecting the polymerizing treatment. The display device prepared in this embodiment are shown in FIG. 5. Referring to FIG. 5, a reference numeral 170 represents the high affinity area formed on the entire surface of the second substrate 20. A reference numeral 160 represents a film connected with the partition wall 30 formed on the high affinity area 170. The film 160 can also be regarded as a sealing film.

After the polymerizing treatment with respect to the partition wall precursor, when the resultant display device was observed from above the second substrate 20, the electrophoretic particles were not observed at end portions and within the partition wall. In other words, during the polymerization process, the electrophoretic particles were not incorporated into the partition wall.

Then, drive of the display device of this embodiment was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state. Even when such a drive of the display device was continued, a phenomenon that the electrophoretic particles were moved to get over the partition wall was not observed. At the same time, evaporation of the dispersion medium was also not observed. In other words, it was conformed that the dispersion liquid was confined by the partition wall and the substrates (sealing film). Further, when the resultant display device was bent back and forth, the phenomenon that the electrophoretic particles were moved to get over the partition wall was not observed.

EXAMPLE 5

A display device was prepared in the same manner as in Example 4 except that a minute structure having a height of 7 μm was formed in a high affinity area on the first substrate 10 side.

In this embodiment, the minute structure was formed of a cured product of a photosensitive resist (trade name: "SU-8", mfd. by 3M Co.). In this embodiment, the oxygen plasma treatment was effected in the vicinity of the minute structure.

The above prepared first and second substrates are oppositely disposed and between which a mixture identical to that used in Example 1 was filled. As a result a state that the partition wall precursor was connected between the above described minute projection structures, was created. This could be confirmed by taking the display device apart after effecting the polymerizing treatment.

Figure 7:
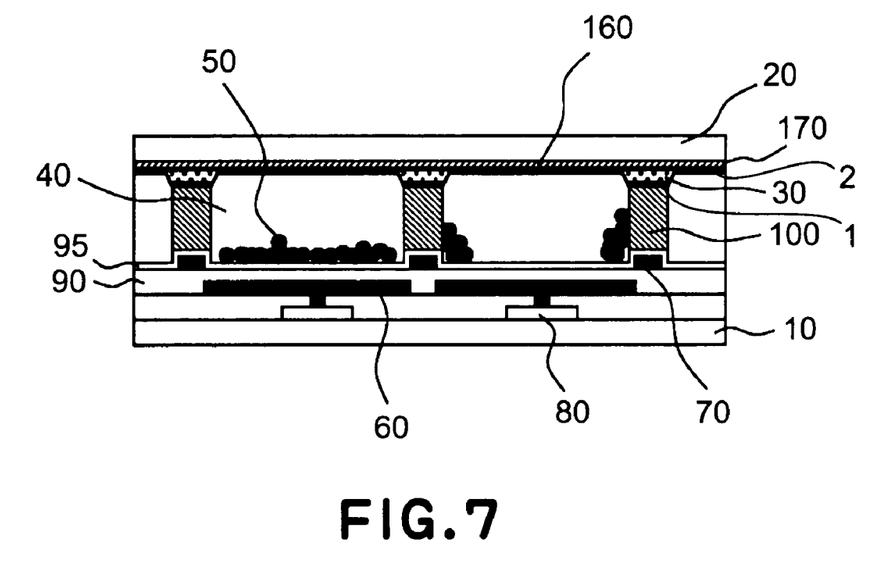

The above prepared display device is schematically shown in FIG. 7.

After the polymerizing treatment with respect to the partition wall precursor, when the resultant display device was observed from above the second substrate 20, the electrophoretic particles were not observed at end portions and within the partition wall. In other words, during the polymerization process, the electrophoretic particles were not incorporated into the partition wall.

Then, drive of the display device of this embodiment was effected by alternately modulating an electric potential of the second electrode between +15 V and −15 mV at a frequency of 1 Hz while grounding the first electrode. As a result, in synchronism with the alternating potential modulation, a resultant display state was alternately changed between a black state and a white state. Even when such a drive of the display device was continued, a phenomenon that the electrophoretic particles were moved to get over the partition wall was not observed. At the same time, evaporation of the dispersion medium was also not observed. In other words, it was conformed that the dispersion liquid was confined by the partition wall and the substrates (sealing film). Further, when the resultant display device was bent back and forth, the phenomenon that the electrophoretic particles were moved to get over the partition wall was not observed.

EXAMPLE 6

A display device was prepared in the same manner as in Example 1 except that a signal capable of collecting the electrophoretic particles o the first electrode 60 in such a process (corresponding to Step 3 described above) wherein a state that the partition wall precursor connects the high affinity areas on the opposite substrates was created, was continuously applied.

In this embodiment, a DC signal of +10 V was applied to the first electrode 60. As a result, in the process of creating the connection state of the partition wall precursor, the electrophoretic particles was in a state that they were located on the first electrode 60.

After the polymerizing treatment with respect to the partition wall precursor, when the resultant display device was observed from above the second substrate 20, the electrophoretic particles were not observed at end portions and within the partition wall. In other words, during the polymerization process, the electrophoretic particles were not incorporated into the partition wall.

Then, drive of the display device of this embodiment was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state. Even when such a drive of the display device was continued, a phenomenon that the electrophoretic particles were moved to get over the partition wall was not observed. At the same time, evaporation of the dispersion medium was also not observed. In other words, it was conformed that the dispersion liquid was confined by the partition wall and the substrates. Further, when the resultant display device was bent back and forth, the phenomenon that the electrophoretic particles were moved to get over the partition wall was not observed.

What is claimed is:

1. A process for producing a display device, comprising:
   (a) a step of providing an area having an affinity for a partition wall precursor higher than a surrounding area therearound at an outermost surface of a first substrate,
   (b) a step of providing an area having an affinity for a partition wall precursor at least in an area corresponding to the area of the first substrate at an outermost surface of a second substrate,
   (c) a step of disposing the first substrate and the second substrate opposite to each other with a spacing therebetween and filling the spacing with a liquid containing the partition wall precursor,
   (d) a step of collecting the partition wall precursor between the area of the first substrate and the area of the second substrate in the spacing, and
   (e) a step of fixing the collected partition wall precursor.

2. A process according to claim 1, wherein the partition wall precursor is a liquid in said step (c) and is solidified in said step (d).

3. A process according to claim 1, wherein the partition wall precursor comprises a polymerizable compound and is cured by polymerization in said step (d).

4. A process according to claim 3, wherein the polymerizable compound having at least one group selected from the group consisting of —O—, —CH$_2$O—, —OH and —CF$_2$—.

5. A process according to claim 1, wherein the partition wall precursor is a particulate solid particle and a plurality of the particles are bonded together in said step (d).

6. A process according to claim 5, wherein the partition wall precursor has a surface provided with an adhesive layer.

7. A process according to claim 1, wherein the partition wall precursor has a mutual affinity higher than an affinity for a dispersion medium.

8. A process according to claim 1, wherein said step (a) or said step (b) further includes a step of disposing hydrophilic molecules at a surface of the first substrate or the second substrate.

9. A process according to claim 1, wherein said step (a) or said step (b) further includes a step of disposing a polymerizable or polar group, which can be bonded to the partition wall precursor at a surface of the first substrate or the second substrate.

10. A process according to claim 1, wherein said step (a) or said step (b) further includes a step of selectively chemically treating a surface of the first substrate or the second substrate.

11. A process according to claim 1, wherein said step (a) or said step (b) further includes a step of providing an unevenness to the first substrate or the second substrate.

12. A process according to claim 1, wherein said step (a) or said step (b) further includes a step of forming a structure at a surface of the first substrate or the second substrate.

13. A process according to claim 1, wherein said step (a) or said step (b) is a step of effecting a treatment for decreasing an affinity for the partition wall precursor at the surrounding area.

14. A partition wall structure, comprising:
a first substrate and a second substrate disposed opposite to each other with a spacing therebetween,
a partition wall disposed in the spacing between said first and second substrates,
a liquid held in the spacing between said first and second substrates and being capable of holding a precursor of the partition wall dissolved or dispersed therein,
an area, having a high affinity for the precursor higher than a surrounding area, disposed between an outermost surface of said first substrate and a lower end of said partition wall, and
an area, having an affinity for the precursor, disposed between an outermost surface of said second substrate and at least an upper end of said partition wall.

15. A structure according to claim 14, wherein said liquid holds charged particles dispersed therein.

16. An electrophoretic display device comprising a partition wall structure according to claim 14.

* * * * *